(12) United States Patent
Watanabe et al.

(10) Patent No.: US 8,913,274 B2
(45) Date of Patent: Dec. 16, 2014

(54) IMAGE PROCESSING SYSTEM, PROCESSING METHOD, IMAGE PROCESSING APPARATUS, AND RELAY APPARATUS FOR ELECTRONIC FILE STORAGE AND TRANSFER

(75) Inventors: Satoshi Watanabe, Nagoya (JP); Katsuaki Ito, Nagoya (JP); Yusuke Shimada, Inazawa (JP); Masafumi Miyazawa, Nagoya (JP); Takeshi Nagasaki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 552 days.

(21) Appl. No.: 13/243,961

(22) Filed: Sep. 23, 2011

(65) Prior Publication Data

US 2012/0081743 A1    Apr. 5, 2012

(30) Foreign Application Priority Data

Sep. 30, 2010   (JP) ................. 2010-220660
Sep. 6, 2011    (JP) ................. 2011-193884

(51) Int. Cl.
*G06F 3/12*     (2006.01)
*G06F 17/30*    (2006.01)

(52) U.S. Cl.
CPC ...... *G06F 17/30899* (2013.01); *G06F 17/3089* (2013.01)
USPC ........... 358/1.15; 709/217; 358/403; 358/407

(58) Field of Classification Search
USPC ......................................... 358/1.15; 709/217
See application file for complete search history.

(56) References Cited

U.S. PATENT DOCUMENTS

| | | |
|---|---|---|
| 2004/0128669 A1 | 7/2004 | Furst et al. |
| 2004/0239984 A1 | 12/2004 | Ishii et al. |
| 2007/0027857 A1 | 2/2007 | Deng et al. |

(Continued)

FOREIGN PATENT DOCUMENTS

| | | |
|---|---|---|
| JP | 2004-355197 A | 12/2004 |
| JP | 2005-269250 A | 9/2005 |
| JP | 2006-202028 A | 8/2006 |
| JP | 2006-260335 A | 9/2006 |

OTHER PUBLICATIONS

European Patent Office, extended European Search Report for European Patent Application No. 11182976.8, dated Mar. 8, 2012.

(Continued)

*Primary Examiner* — Benjamin O Dulaney
(74) *Attorney, Agent, or Firm* — Merchant & Gould PC

(57) ABSTRACT

An image processing system includes: an image processing apparatus; a relay apparatus; and a service providing apparatus, which are connected to a network. The image processing apparatus includes: an electronic-file storage unit; an address-get-request transmitting unit; an upload-message generating unit which, upon receiving an upload destination address and a template for an upload message for performing an upload request to the service providing apparatus from the relay apparatus after a request for getting the upload destination address is transmitted to the relay apparatus by the account-information-request transmitting unit, generates the upload message including an electronic file and the upload destination address according to the received template; and an upload-message transmitting unit that transmits the upload message to the service providing apparatus to upload the electronic file to the service providing apparatus. The relay apparatus includes: a program storage unit; an upload-destination-address getting unit; and an upload-destination-address transmitting unit.

12 Claims, 7 Drawing Sheets

(56) References Cited

U.S. PATENT DOCUMENTS

| | | | |
|---|---|---|---|
| 2008/0192287 A1* | 8/2008 | Iwai | 358/1.15 |
| 2009/0083304 A1 | 3/2009 | Dornbach et al. | |
| 2009/0144558 A1* | 6/2009 | Wang | 713/189 |
| 2009/0207460 A1* | 8/2009 | Hikawa et al. | 358/448 |
| 2009/0276493 A1* | 11/2009 | Hikawa et al. | 709/205 |
| 2009/0296133 A1* | 12/2009 | Kawabushi et al. | 358/1.15 |
| 2010/0245929 A1* | 9/2010 | Gopalasamy | 358/402 |
| 2011/0106882 A1* | 5/2011 | Takakura et al. | 709/203 |
| 2012/0162713 A1 | 6/2012 | Minamiyama | |

OTHER PUBLICATIONS

European Patent Office, extended European Search Report for European Patent Application No. 11182979.2, dated Mar. 8, 2012.

Office Action issued in Chinese Application No. 201110300687.7, mailed Jul. 10, 2014.

\* cited by examiner

IMAGE PROCESSING SYSTEM, PROCESSING METHOD, IMAGE PROCESSING APPARATUS, AND RELAY APPARATUS FOR ELECTRONIC FILE STORAGE AND TRANSFER

CROSS-REFERENCE TO RELATED APPLICATIONS

This application claims priority from Japanese Patent Application No. 2010-220660 filed on Sep. 30, 2010 and Japanese Patent Application No. 2011-193884 filed on Sep. 6, 2011, the entire subject matter of which is incorporated herein by reference.

TECHNICAL FIELD

The invention relates to an image processing system, an image processing method, an image processing apparatus, and a relay apparatus which upload an electronic file of an image to a service providing apparatus.

BACKGROUND

There has been known image reading apparatuses for uploading an electronic file of a read image to a server, print apparatuses for printing electronic files downloaded from a server, and the like. There has been proposed a related-art image reading apparatus for uploading an electronic file of a read image to a server. In a case where a maker of image reading apparatuses or print apparatuses provides an electronic-file storing service, the maker needs to prepare a dedicated server for storing uploaded electronic files on maker's own.

Meanwhile, recently, electronic-file storing services capable of storing electronic files in a database on a network prepared by a server provider are in widespread use. For example, a Picasa (a registered trademark) web album or flickr (a registered trademark) is an example of the electronic-file storing services. Users can use terminal devices having web browsers to upload desired electronic files to service providing apparatuses for electronic-file storing services or download desired electronic files from the service providing apparatuses for electronic-file storing services. In many electronic-file storing services, their own application program interfaces (API) are provided. A maker receiving the services can use the provided API to provide electronic-file storing services and the related services to users.

SUMMARY

Many service providers providing electronic-file storing services provide a usable API in each service. Therefore, instead of uploading image files of images read in the above-described image reading apparatuses to a dedicated server prepared by the image reading apparatus maker, it may be considered to upload the electronic files to a service providing apparatus prepared by a service provider providing the electronic-file storing services.

In a case where a maker of an image processing apparatus for processing read image data or stored image data provides an electronic-file storing service using a service providing apparatus provided by a service provider, the image processing apparatus needs to have a program for using an API which the service provider provides for using the electronic-file storing service. However, the API, which is provided by the service provider for using the electronic-file storing service, may be updated for service provider's reasons. Although the API is updated for service provider's reasons, in order to maintain coordination between the image processing apparatus and the electronic-file storing service, the maker of the image processing apparatus should update programs of the image processing apparatus owned by a user.

Also, even in a case where the image processing apparatus maker adds or erases an electronic-file storing service capable of cooperating with the image processing apparatus, it is required to upload the programs of the image processing apparatus owned by the user. Therefore, in order to maintain the cooperation between the image processing apparatus and the electronic-file storing service, the image processing apparatus maker should always perform program maintenance and management such as update of the programs of the image processing apparatus owned by the user.

Illustrative aspects of the invention provide an image processing system, an image processing method, and an image processing apparatus which can store electronic files in a service providing apparatus of a service provider providing electronic-file storing services even when the image processing apparatus does not have a program using an API which the service provider provides for using the electronic-file storing services, and can suppress the operational cost of a relay apparatus relaying communication between the image processing apparatus and the service provider or the equipment investment cost for the relay apparatus.

According to one aspect of the invention, there is provided an image processing system comprising: a relay apparatus that is connected to a network, to which a service providing apparatus for an electronic-file storing service is connected; and an image processing apparatus connected to the network, wherein the image processing apparatus comprises: an electronic-file storage unit that stores an electronic file of an image; an address-get-request transmitting unit that transmits a request for getting an upload destination address representing an destination for upload of the electronic file to the service providing apparatus to the relay apparatus; an upload-message generating unit which, upon receiving the upload destination address and a template for an upload message for performing an upload request to the service providing apparatus from the relay apparatus after the request for getting the upload destination address is transmitted to the relay apparatus by the account-information-request transmitting unit, generates the upload message including the electronic file stored in the electronic-file storage unit and the upload destination address according to the received template; and an upload-message transmitting unit that transmits the upload message generated by the upload-message generating unit to the service providing apparatus so as to perform upload of the electronic file to the service providing apparatus, and wherein the relay apparatus comprises: a program storage unit that stores an upload destination address get program for getting the upload destination address from the service providing apparatus, wherein the upload destination address get program uses an API provided for using the electronic-file storing service; an upload-destination-address getting unit which, upon receiving the request for getting the upload destination address from the image processing apparatus, gets the upload destination address from the service providing apparatus by executing the upload destination address get program; and an upload-destination-address transmitting unit which, upon receiving the request for getting the upload destination address from the image processing apparatus, transmits the template for the upload message and the upload destination address got by the upload-destination-address getting unit to the image processing apparatus.

According thereto, even when the image processing apparatus does not have any program for using the API provided in the electronic-file storing service, it is possible to upload electronic files of images to the service providing apparatus for the electronic-file storing service. Further, since the electronic files do not pass through the relay apparatus, it is possible to suppress the operational cost of the relay apparatus or the equipment investment cost for the relay apparatus. Still further, even when the API is updated for service provider's reasons, it is possible to maintain the cooperation between the image processing apparatus and the electronic-file storing service without updating programs of the image processing apparatus.

According to another aspect of the invention, there is provided an image processing apparatus that is connected to a network, to which a relay apparatus and a service providing apparatus for an electronic-file storing service are connected, the image processing apparatus comprising: an electronic-file storage unit that stores an electronic file of an image; an address-get-request transmitting unit that transmits a request for getting an upload destination address representing an destination for upload of the electronic file to the service providing apparatus to the relay apparatus; an upload-message generating unit which, upon receiving the upload destination address and a template for an upload message for performing an upload request to the service providing apparatus from the relay apparatus after the request for getting the upload destination address is transmitted to the relay apparatus by the account-information-request transmitting unit, generates the upload message including the electronic file stored in the electronic-file storage unit and the upload destination address according to the received template; and an upload-message transmitting unit that transmits the upload message generated by the upload-message generating unit, to the service providing apparatus so as to perform upload of the electronic file to the service providing apparatus.

According to still another aspect of the invention, there is provided a relay apparatus that is connected to a network, to which a service providing apparatus for an electronic-file storing service and an image processing apparatus are connected, the relay apparatus comprising: a program storage unit that stores an upload destination address get program for getting the upload destination address from the service providing apparatus, wherein the upload destination address get program uses an API provided for using the electronic-file storing service, an upload-destination-address getting unit which, upon receiving a request for getting the upload destination address from the image processing apparatus, gets the upload destination address from the service providing apparatus by executing the upload destination address get program, a template generating unit that generates a template for an upload message for performing a request for upload to the service providing apparatus, and an upload-destination-address transmitting unit which, upon receiving the request for getting the upload destination address from the image processing apparatus, transmits the template for the upload message generated by the template generating unit and the upload destination address got by the upload-destination-address getting unit to the image processing apparatus.

According to the aspects of the present invention, even when the image processing apparatus does not have any program for using the API provided in the electronic-file storing service, it is possible to upload electronic files of images to the service providing apparatus for the electronic-file storing service, and since the electronic files do not pass through the relay apparatus, it is possible to suppress the operational cost of the relay apparatus or the equipment investment cost for the relay apparatus.

DETAILED DESCRIPTION

Hereinafter, exemplary embodiments of the present invention will be described with reference to the accompanying drawings. The drawings to be referred to are used for explaining technical features usable in the present invention. Configurations of devices, apparatuses, and systems, flow charts of various processes, and the like to be described below are simple explanation examples. They are not intended to limit the present invention.

First Exemplary Embodiment

<Outline of Service Cooperation System 10>

Figure 1:
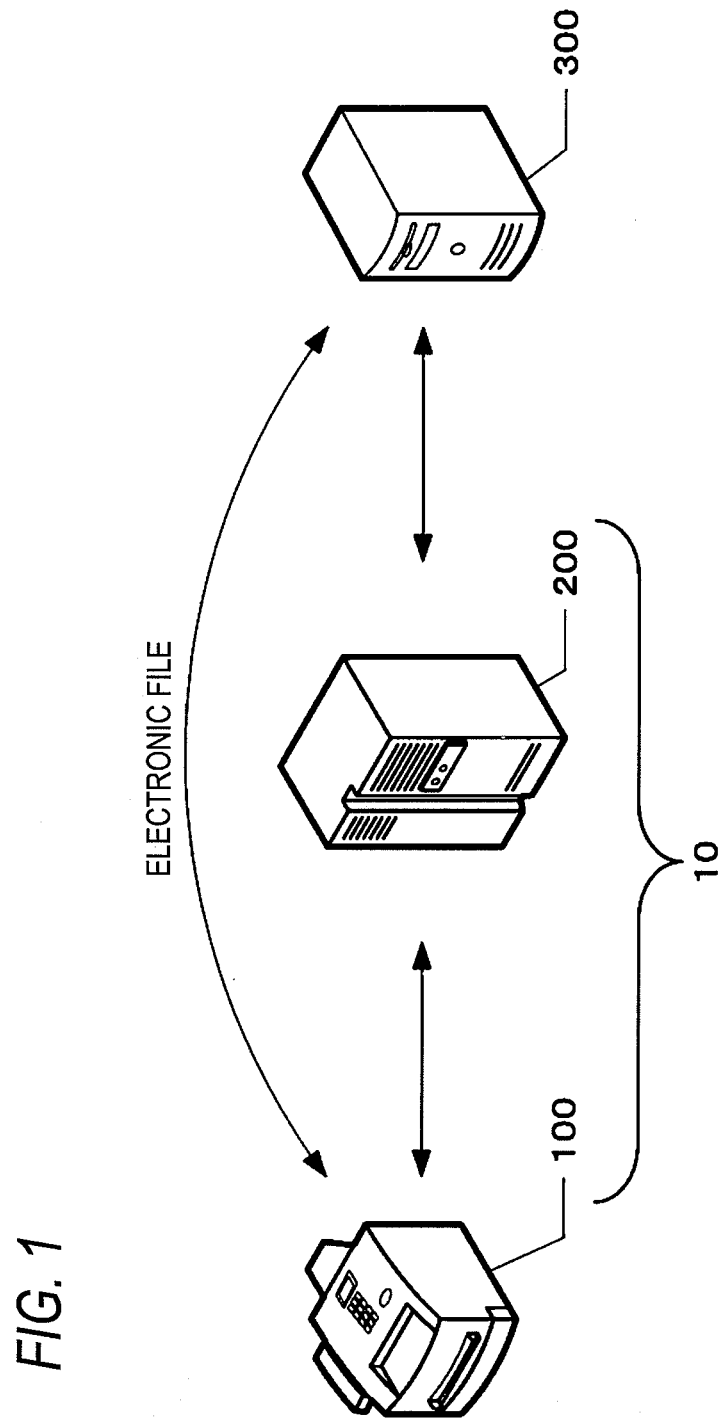
FIG. 1 is a schematic diagram illustrating an outline of a service cooperation system according to a first exemplary embodiment of the present invention.

An outline of a service cooperation system 10 according to a first exemplary embodiment of the present invention will be described with reference to FIG. 1. The service cooperation system 10 includes a multi-function device 100 and a relay apparatus 200. The service cooperation system 10 can perform upload or download of an electronic file in an electronic-file storing service which a service provider provides.

The electronic-file storing service is provided by a service providing apparatus 300 placed on the Internet by each service provider. Specifically, the service providing apparatus 300 is a known web server. The service providing apparatus 300 communicates with other terminals connected to the Internet on the basis of HTTP or HTTPS so as to provide a predetermined service to the terminals.

Specifically, the multi-function device 100 is a small-sized digital combined machine. The multi-function device 100 has a print function, a scanner function, a fax function, and copy function.

The multi-function device 100 can upload an electronic file of an image read by the scanner function of the multi-function device 100 to the service providing apparatus 300 for the electronic-file storing service.

Also, the multi-function device 100 can print an electronic file downloaded from the service providing apparatus 300 for the electronic-file storing service by the print function of the multi-function device 100.

The multi-function device 100 performs upload and download of electronic files in cooperation with the relay apparatus 200. The multi-function device 100 obtains URLs from the service providing apparatus 300 for the electronic-file storing service through the relay apparatus 200. The URLs includes an uploading destination URL that is an URL of a destination of upload of an electronic file to the service providing apparatus 300 for the electronic-file storing service, an electronic-file URL that is a URL of an electronic file to be downloaded from the service providing apparatus 300 for the electronic-file storing service, and the like. However, electronic files are directly transmitted to and received from the service providing apparatus 300 for the electronic-file storing service without passing through the relay apparatus 200. Therefore, in a case where the amount of data passing through the relay apparatus 200 is large, the service cooperation system 10 can suppress a load of data processing on the relay apparatus 200. In general, transmitted and received electronic files are binary data or text data.

The relay apparatus 200 may be a known apparatus having a server function. The relay apparatus 200 may also be a server owned by a maker of the multi-function device 100. However, it can be considered to use a known rental server or a virtual machine as represented by Amazon (a registered trademark) EC2, as the relay apparatus 200. In this case, the operational cost of the relay apparatus 200 changes according to the amount of data passing through the relay apparatus 200 and the load of processing on the relay apparatus 200. As described above, in the case where a rental server or a virtual machine is used, the operational cost of the relay apparatus 200 can be suppressed by reducing the amount of data passing through the relay apparatus 200 or reducing the load of data processing on the relay apparatus 200. Even in a case where the maker of the multi-function device 100 owns the relay apparatus 200, since the relay apparatus 200 does not need high processing performance, the equipment investment for the relay apparatus can be suppressed.

<Hardware Configuration of Service Cooperation System 10>

Figure 2:
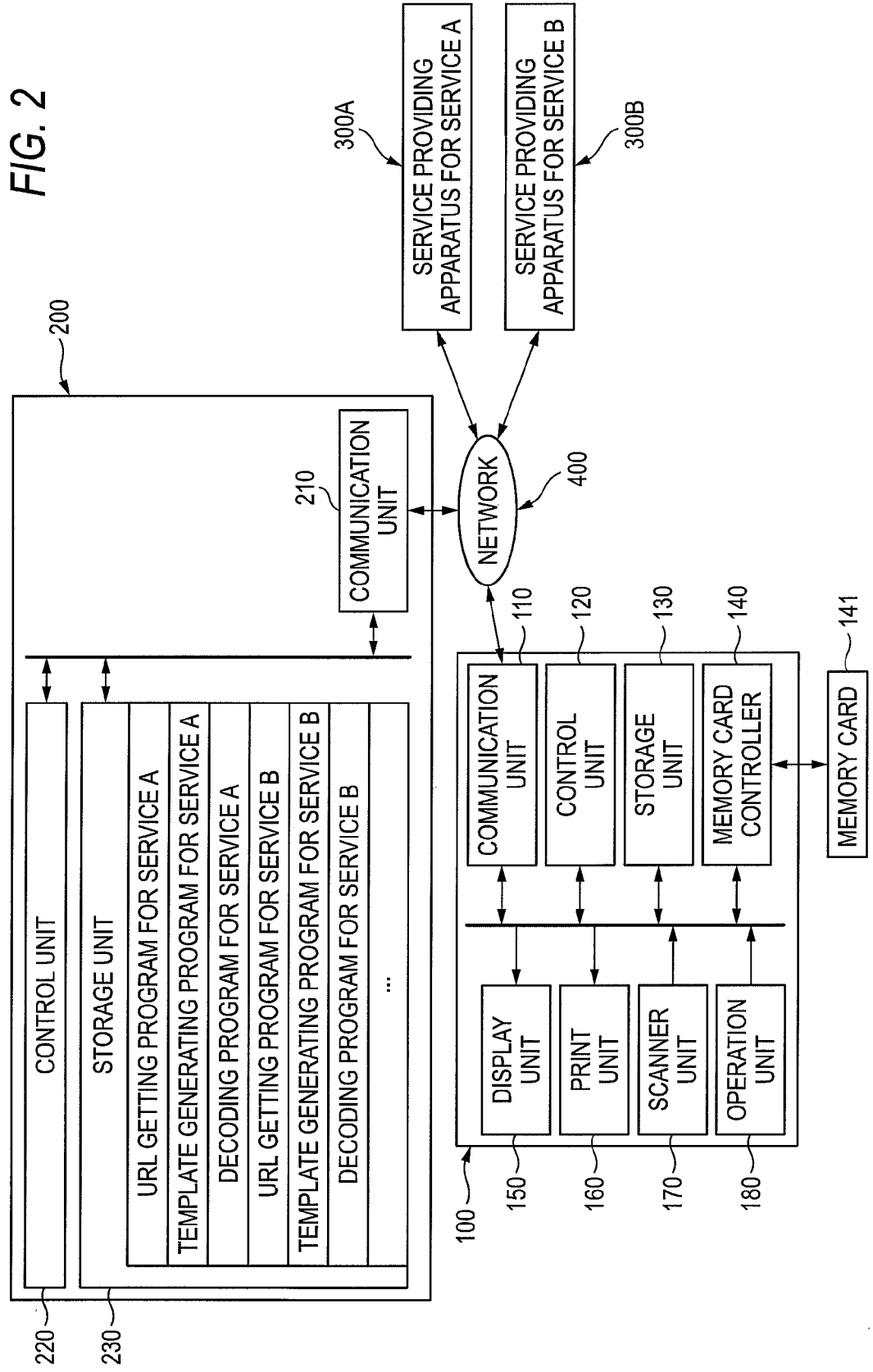
FIG. 2 is a block diagram illustrating a hardware configuration of the service cooperation system.

A hardware configuration of the service cooperation system 10 will be described with reference to FIG. 2. The following description will be made on assumption that the service cooperation system 10 performs cooperation of two electronic-file storing services, that is, a service A and a service B. In the following description, a service providing apparatus 300 for the service A is referred to as a service providing apparatus 300A. Also, a service providing apparatus 300 for the service B is referred to as a service providing apparatus 300B. In a case where it is unnecessary to particularly distinguish both sides from each other, the service providing apparatus 300A and the service providing apparatus 300B are generally referred to as the service providing apparatus 300. The multi-function device 100, the relay apparatus 200, the service providing apparatus 300A, and the service providing apparatus 300B are connected to one another through a network 400. As the network 400, for example, an Internet network can be used. The multi-function device 100, the relay apparatus 200, and the service providing apparatus 300 perform data transmission and reception with one another on the basis of HTTP.

First, a hardware configuration of the multi-function device 100 will be described. The multi-function device 100 includes a communication unit 110, a control unit 120, a storage unit 130, a memory card controller 140, a display unit 150, a print unit 160, a scanner unit 170, and an operation unit 180.

The communication unit 110 is a device for performing communication with other devices connected to the network. As the communication unit 110, a known network card can be used.

The control unit 120 includes a CPU, and a ROM and RAM connected to the CPU (not shown). The CPU controls the operation of the multi-function device 100 according to programs stored in the ROM. The RAM is a storage device for temporarily storing various data.

The storage unit 130 is a non-volatile storage device such as a NAND-type flash memory. The storage unit 130 stores user identification information for identifying a user of the multi-function device 100, various set information, etc.

The memory card controller 140 controls the memory of a memory card 141 connected to the multi-function device 100. Specifically, the memory card controller 140 performs writing of data in the memory card 141, erasing of data stored in the memory card 141, reading of data stored in the memory card 141, or the like, on the basis to an instruction of the control unit 120. In the memory card 141, electronic files having a predetermined format are stored.

The display unit 150 is a display device having a display such as a known LCD. The display unit 150 displays predetermined information such as a menu item selection screen (to be described below), on the basis of an instruction form the control unit 120.

The print unit 160 is a device which prints images according to an instruction of the control unit 120.

The scanner unit 170 is a device that reads images recorded on a sheet set by a user. The scanner unit 170 reads images according to an instruction of the control unit 120.

The operation unit 180 is a device that includes a plurality of operation buttons operable by the user, and transmits signals based on the pushing operation of the user to the control unit 120. The user can input a desired instruction by operating the operation unit 180.

Next, a hardware configuration of the relay apparatus 200 will be described. The description of the present exemplary embodiment will be made on assumption that the relay apparatus 200 is a physically existing server. Incidentally, the relay apparatus 200 may be a virtual machine, such as EC2, which functions as a server in cooperation with a plurality of physical devices as described above.

The relay apparatus 200 includes a communication unit 210, a control unit 220, and a storage unit 230.

The communication unit 210 is a device for performing communication with other devices connected to the network. As the communication unit 210, a known network card can be used.

The control unit 220 includes a CPU, and a ROM and RAM connected to the CPU (not shown). The CPU controls the operation of the relay apparatus 200 according to programs stored in the ROM and the storage unit 230. The RAM is a storage device for temporarily storing various data.

The storage unit 230 is a non-volatile storage device such as a hard disk drive. The storage unit 230 stores a plurality of software modules including a URL getting program for the service A, a template generating program for the service A, a decoding program for the service A, a URL getting program for the service B, a template generating program for the service B, and a decoding program for the service B. Also, in order to relay communication between the multi-function device 100 and the service providing apparatus 300 in cooperation with the plurality modules, the storage unit 230 stores a relay program shown by a flow chart of FIG. 6.

The URL getting program for the service A is a program that gets an upload destination URL from the service providing apparatus 300A by using an API provided in the service A. The template generating program for the service A is a program that generates a template for an upload message which is a message for uploading an electronic file in the service A.

The decoding program for the service A is a program for decoding a response message from the service providing apparatus 300A. In general, an API is a set of commands or functions written in a URL getting program that the relay apparatus 200 has. The API written in the URL getting program may be executed so as to receive services provided by a service provider. For example, the service provider provides many API such as an AIP requiring an album list, or an API for creating an album. A maker receiving the services can develop software using the provided APIs so as to provide services to the users in cooperation with each electronic-file storing service.

The URL getting program for the service B is a program that gets an upload destination URL from the service providing apparatus 300B by using an API provided in the service B. The template generating program for the service B is a program that generates a template for an upload message which is a message for uploading an electronic file in the service B. The decoding program for the service B is a program for decoding a response message from the service providing apparatus 300B.

The multi-function device 100 can designate a desired service of a plurality of electronic-file storing services according to the operation of the operation unit 180 by the user. Then, the multi-function device 100 can upload a desired electronic file to a service providing apparatus for the designated service. Also, the multi-function device 100 can selects which of an electric file of an image read by the scanner unit 170 or an existing electronic file stored in the memory card 141 will be uploaded, according to the operation of the operation unit 180 by the user.

<Operation of Service Cooperation System 10>

Figure 3:
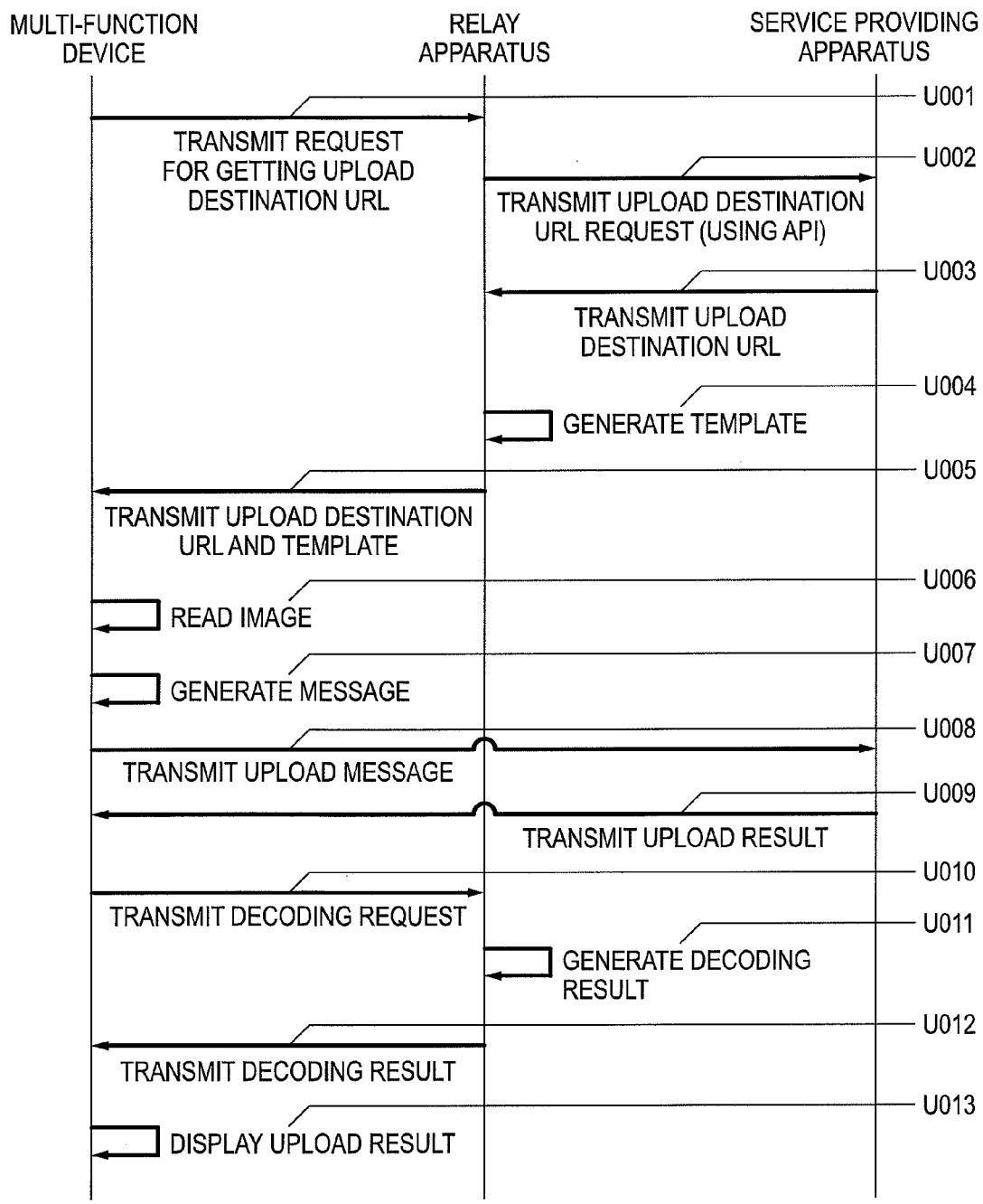
FIG. 3 is a flow chart illustrating an example of an operation of the service cooperation system.

Next, an example of the operation of the service cooperation system 10 will be described with reference to FIG. 3. FIG. 3 is a flow chart illustrating an example of the operation of the service cooperation system 10. In this example, a flow in a case where the multi-function device 100 selects upload of the electronic file of the image read by the scanner unit 170, according to the operation of the operation unit 180 by the user will be described. In the following description, the electronic-file storing service is simply referred to as the service.

First, when the user operates the operation unit 180 of the multi-function device 100 to select a service for uploading the electronic file, in step U001, the multi-function device 100 transmits a request for getting an upload destination URL to the relay apparatus 200. The request for getting the upload destination URL includes service identification information for identifying the service selected by the operation of the user, and user identification information for identifying the user.

Upon receiving the request for getting the upload destination URL, in step U002, the relay apparatus 200 transmits an upload destination URL request to the service providing apparatus 300 for the service selected by the operation of the user. The relay apparatus 200 identifies the service and the user on the basis of the service identification information and the user identification information included in the request for getting the upload destination URL received from the multi-function device 100. When the relay apparatus 200 receives the request for getting the upload destination URL, and identifies the service and the user, the URL getting program including the API regarding the identified service incorporates the user identification information and is executed. By the execution of the URL getting program, the relay apparatus 200 generates the upload destination URL request corresponding to the service and the user, and transmits the upload destination URL request to the service providing apparatus 300.

Specifically, in a case where the user designates the service A, the relay apparatus 200 executes the URL getting program for the service A stored in the storage unit 230 so as to generate the upload destination URL request corresponding to the service A, and transmits the upload destination URL request to the service providing apparatus 300A. The transmitted upload destination URL request is an HTTP message included in the API provided in the service A. APIs for getting upload destination URLs are different for each service. For this reason, the relay apparatus 200 has URL getting programs for transmitting upload destination URL requests according to each service. Specifically, the relay apparatus 200 has the URL getting program for the service A for transmitting the upload destination URL request for the service A, and the URL getting program for the service B for transmitting the upload destination URL request for the service B. The relay apparatus 200 executes the URL getting programs so as to transmit the upload destination URL requests corresponding to each service.

Information included in the transmitted upload destination URL requests may be different for each service. In a case where in order for the service providing apparatus 300 to specify the upload destination URL, an album ID is required as information for specifying the electronic-file storage position for the service, account information such as an album ID of an album used by the user or user identification information is included in the upload destination URL request. Also, in a case where a folder name is required as the information for specifying the electronic-file storage position for the service in order for the service providing apparatus 300 to specify the upload destination URL, the account information such as a folder name of a folder used by the user or the user identification information is included in the upload destination URL request. The account information such as the album ID of the album used by the user or the user identification information is stored in the storage unit 230 in advance. The relay apparatus 200 transmits the upload destination URL request according to each service, such that the electronic-file storage position for the service are specified by using the required account information.

Upon receiving the upload destination URL request, in step U003, the service providing apparatus 300 transmits a URL corresponding to the upload destination URL request as a upload destination URL to the relay apparatus 200.

After receiving the upload destination URL request and transmitting the upload destination URL request to the service providing apparatus 300 in step U002, in step U004, the relay apparatus 200 generates a template for an upload message to be transmitted from the multi-function device 100 to the service providing apparatus 300. Specifically, the relay apparatus 200 generates a template according to each service using a template generating program corresponding to the service designated by the operation of the user.

In order to generate templates appropriate for various services, the relay apparatus 200 has programs for generating templates for each service. Specifically, the relay apparatus 200 has the template generating program for the service A, and the template generating program for the service B.

The relay apparatus 200 that has got the upload destination URL in step U003 and has generated the template for the upload message in step U004 transmits the upload destination URL received from the service providing apparatus 300 and the generated template to the multi-function device 100 in step U005.

Upon receiving the upload destination URL and the template from the relay apparatus 200, in response to the operation of the user, the multi-function device 100 reads an image and generates an electronic file of the read image in step U006.

In step U007, the multi-function device 100 generates the upload message on the basis of the template got from the relay apparatus 200. The generated upload message includes the upload destination URL got from the relay apparatus 200 and binary data of the electronic file of the read image. The multi-function device 100 can generate the upload message according to each service only by storing the binary data of the electronic file, the upload destination URL, and the data size of the electronic file at a predetermined position of the template received from the relay apparatus 200.

After generating the upload message, in step U008, the multi-function device 100 transmits the upload message to the service providing apparatus 300 for the service selected by the operation of the user. The multi-function device 100 can upload an electronic file of a desired image to a service providing apparatus 300 for a desired service.

The contents of the upload messages transmitted to the service providing apparatus 300 are different for each service. The upload message is a message for performing an upload request to the service providing apparatus 300 for the electronic-file storing service. Specifically, the upload message is a request message according to the HTTP message. In upload messages, kinds of information contained in headers, kinds of information contained in request bodies, and amounts of information are different for each service. For example, some services may require that not only binary data of an electronic file but also additional information such as the name or title of the electronic file are contained in a request body, and some services may require that only binary data of an electronic file is contained in a request body and additional information such as the name or title of the electronic file is contained in a header.

The service providing apparatus 300 that has received the upload message transmits a response message representing an upload result to the multi-function device 100 in step U009. The multi-function device 100 receives the response message including the upload result from the service providing apparatus 300. The contents of upload messages are different for each service. For this reason, the multi-function device 100 cannot decode the response message. The upload result is information representing whether the electronic file has been normally uploaded or not. In a case where the electronic file has been normally uploaded, information representing the ID of the electronic file is also included in the upload result.

Since the multi-function device 100 is unable to decode the response message, at this state, the multi-function device 100 is unable to display the upload result on the display unit 150. For this reason, in step U010, the multi-function device 100 transmits a decoding request to the relay apparatus 200 to make the relay apparatus 200 decode the response message. A message for the decoding request includes the entire response message received by the multi-function device 100.

Upon receiving the decoding request, the relay apparatus 200 generates a result of decoding of the response message in step U011. Specifically, the relay apparatus 200 extracts the upload result included in the response message, and generates, as the decoding result, a message including the upload result in a format decodable in the multi-function device 100. The decoding result is generated on the basis of the decoding program corresponding to the service designated by the operation of the user. Specifically, in a case where the service designated by the operation of the user is the service A, the relay apparatus 200 generates the decoding result on the basis of the decoding program for the service A stored in the storage unit 230. On the other hand, in a case where the service designated by the operation of the user is the service B, the relay apparatus 200 generates the decoding result on the basis of the decoding program for the service B stored in the storage unit 230.

The relay apparatus 200 that has generated the decoding result transmits the generated decoding result to the multi-function device 100 in step U012.

Upon receiving the decoding result, the multi-function device 100 displays the upload result included in the received decoding result on the display unit 150 in step U013. This display enables the user to confirm whether the upload has succeeded or not. In a case where the upload has succeeded, the user can confirm where the uploaded electronic file has been stored by the display of the display unit 150.

The above description based on the flow chart is absolutely an example, and does not limit the present invention. For example, in a case of a service like flickr (a registered trademark) requiring that, after completing upload of an electronic file, the uploaded electronic file is mapped with a predetermined album, the relay apparatus 200 performs the following process in step U011. The relay apparatus 200 that has received the decoding request from the multi-function device 100 decodes the upload result which is the response message from the service providing apparatus 300. The relay apparatus 200 transmits an instruction for mapping the uploaded electronic file with a predetermined album to the service providing apparatus 300. Then, the relay apparatus 200 adds information representing that the electronic file has been mapped with the album to the decoding result, and transmits the decoding result to the multi-function device 100.

<Operation of Multi-Function Device 100>

Figure 4:
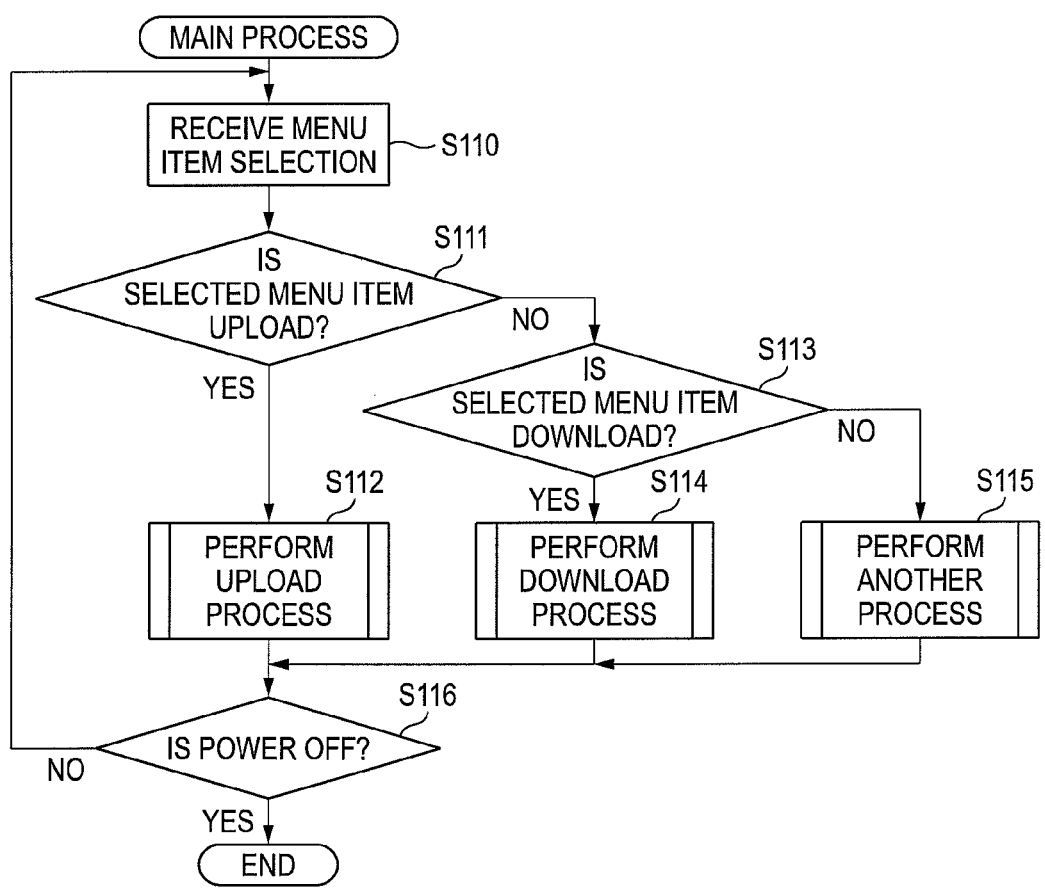
FIG. 4 is a flow chart illustrating a main process of a multi-function device.
Figure 5:
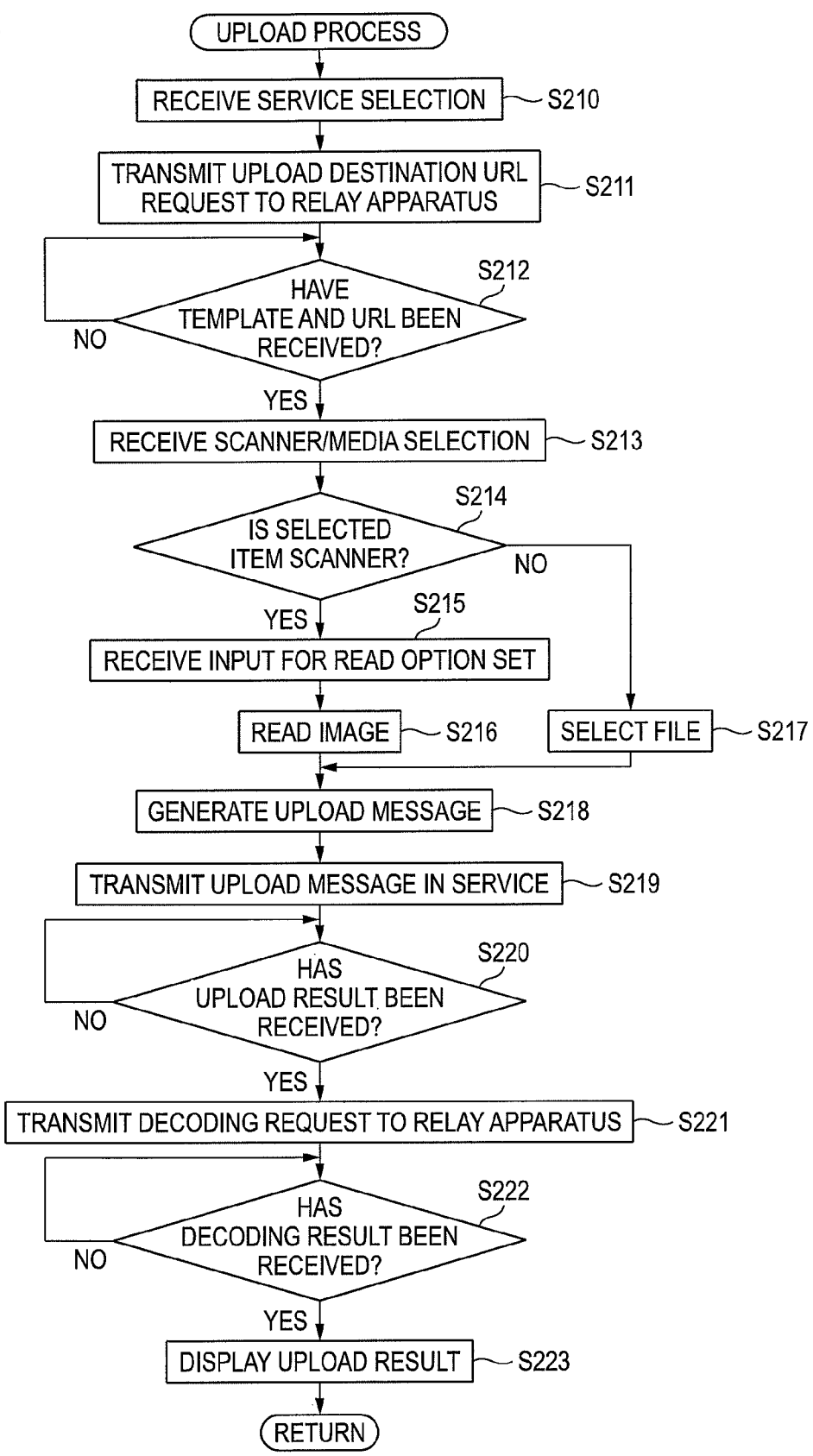
FIG. 5 is a flow chart illustrating an upload process of the main process.

Next, a detailed operation of the multi-function device 100 will be described with reference to FIGS. 4 and 5. If power of the multi-function device 100 is turned on, the control unit 120 of the multi-function device 100 starts a main process shown in FIG. 4 in accordance with a predetermined program stored in the ROM.

First, in step S110, the control unit 120 displays a menu item selection screen on the display unit 150, and receives a menu item selection from the user. A plurality of menu items are displayed on the menu item selection screen. The user can select a desired menu item by operating the operation unit 180. The plurality of menu items includes at least menu items of 'UPLOAD' and 'DOWNLOAD'.

The menu item 'UPLOAD' is a menu item that is selected for uploading a desired electronic file in an electronic-file storing service. Also, the menu item 'DOWNLOAD' is a menu item that is selected for downloading a desired electronic file from the service providing apparatus 300 for the electronic-file storing service.

After receiving the menu item selection from the user, in step S111, the control unit 120 determines whether the selected menu item is 'UPLOAD' or not.

In a case where the selected menu item is 'UPLOAD' (Yes in step S111), in step S112, the control unit 120 performs an upload process (which will be described later).

In a case where the selected menu item is not 'UPLOAD' (No in step S111), in step S113, the control unit 120 determines whether the selected menu item is 'DOWNLOAD' or not.

In a case where the selected menu item is 'DOWNLOAD' (Yes in step S113), in step S114, the control unit 120 performs a download process. The download process is a process for downloading an electronic file from the service providing apparatus 300 for the service selected by the operation of the user.

In a case where the selected menu item is not 'DOWNLOAD' (No in step S113), in step 115, the control unit 120 performs another process according to the menu item selection.

After performs any one of steps S112, S114, and S115, in step S116, the control unit 120 determines whether the user has performed operation for turning off, or not. In a case where the user has not performed the operation for turning off the power (No in step S116), the control unit 120 returns to the step S110 and repeats the processes of steps S110 to S115. In a case where the user has performed the operation for turning off (Yes in step S116), the control unit 120 turns off the power of the multi-function device 100 and ends the main process.

Next, the upload process will be described in detail with reference to FIG. 5. When the upload process starts, in step S210, the control unit 120 displays a service selection screen on the display unit 150, and receives a selection of a desire service from the user. In the present exemplary embodiment, the desired service is selected from the service A and service B by operation of the user. If the user selects any service by operation, the control unit 120 stores the service identification information for identifying the service selected by the operation of the user, in the RAM.

After receiving the service selection, in step S211, the control unit 120 transmits the upload destination URL request to the relay apparatus 200. As described above, the upload destination URL request includes the service identification information and the user identification information. As the service identification information, the service identification information stored in the RAM in step S210 may be used. The storage unit 130 stores the user identification information for identifying the user of the multi-function device 100 in advance. As the user identification information of the upload destination URL request, the user identification information stored in the storage unit 130 may be used. In a case where a plurality of users share one multi-function device 100, after a user selects the menu item 'UPLOAD' by operation, the control unit 120 may perform a login process of the user by a known method so as to identify the user that is operating the multi-function device 100 on the basis of the user identification information.

After transmitting the upload destination URL request, in step S212, the control unit 120 determines whether the template for the upload message and the upload destination URL have been received from the relay apparatus 200 that has transmitted the upload destination URL request in step S211, or not.

In a case where the template and the upload destination URL have not been received from the relay apparatus 200 (No in step S212), the control unit 120 stands by until the template and the upload destination URL are received.

In a case where the template and the upload destination URL have been received from the relay apparatus 200 (Yes in step S212), in step S213, the control unit 120 displays a scanner/media selection screen on the display unit 150, to enable the user to select an electronic-file upload method. On the scanner/media selection screen, items 'SCANNER' and 'MEDIA' are displayed as selection items of an upload method. The item 'SCANNER' is an item for reading an image printed on a sheet in the scanner unit 170 and uploading an electronic file of the image to the service providing apparatus 300. The item 'MEDIA' is an item for selecting a desired electronic file from electronic files stored in advance in the memory card 141 and uploading the selected electronic file to the service providing apparatus 300.

In a case where the item 'SCANNER' is selected by the operation of the user (Yes in step S214), in step S215, the control unit 120 displays an input screen for read option set on the display unit 150 and receives an input for read option set from the user. The read option set means set on various options such as whether to read the image printed on the sheet in color or monochrome, and a resolution to be used for reading.

If the user sets a predetermined sheet having an image recorded thereon in the scanner unit 170 and pushes a read start button of the operation unit 180, in step S216, the control unit 120 controls the scanner unit 170 to read the image recorded on the sheet, and generates an electronic file of the read image. At this time, the scanner unit 170 performs reading according to the options set in step S215. The control unit 120 controls the storage unit 130 to store the generated electronic file.

On the other hand, in a case where the item 'MEDIA' is selected by the operation of the user (No in step S214), in step S217, the control unit 120 displays a file selection screen enabling the user to select a desired electronic file from the electronic files stored in the memory card 141, and receives an electronic file selection by operation of the user. The control unit 120 controls the memory card controller 140 to read the selected electronic file from the memory card 141 and controls the storage unit 130 to store the selected electronic file read by the memory card controller 140.

After step S216 or S217, in step S218, the control unit 120 generates the upload message on the basis of the received template, the received upload destination URL, and either the electronic file generated in step S216 or the electronic file selected in step S217. The upload message is generated as described with respect to step U008.

After generating the upload message, in step S219, the control unit 120 transmits the upload message to the service providing apparatus 300 for the service selected by the operation of the user.

Next, in step S220, the control unit 120 determines whether the response message representing the upload result has been received from the service providing apparatus 300.

In a case where the upload result has not been received from the service providing apparatus 300 (No in step S220), the control unit 120 stands by until the upload result is received.

In a case where the upload result has been received from the service providing apparatus 300 (Yes in step S220), in step S221, the control unit 120 transmits the decoding request to the relay apparatus 200. As described above, the decoding request includes the response message received from the service providing apparatus 300. Also, the decoding request includes the service identification information for identifying the service selected by the operation of the user.

Next, in step S222, the control unit 120 determines whether the decoding result has been received from the relay apparatus 200. In a case where the decoding result has not been received from the relay apparatus 200 (No in step S222), the control unit 120 stands by until the decoding result is received.

In a case where the decoding result has been received from the relay apparatus 200 (Yes in step S222), the control unit 120 displays the upload result on the display unit 150 on the basis of he received decoding result in step S223, and returns to the main process.

<Operation of Relay Apparatus 200>

Figure 6:
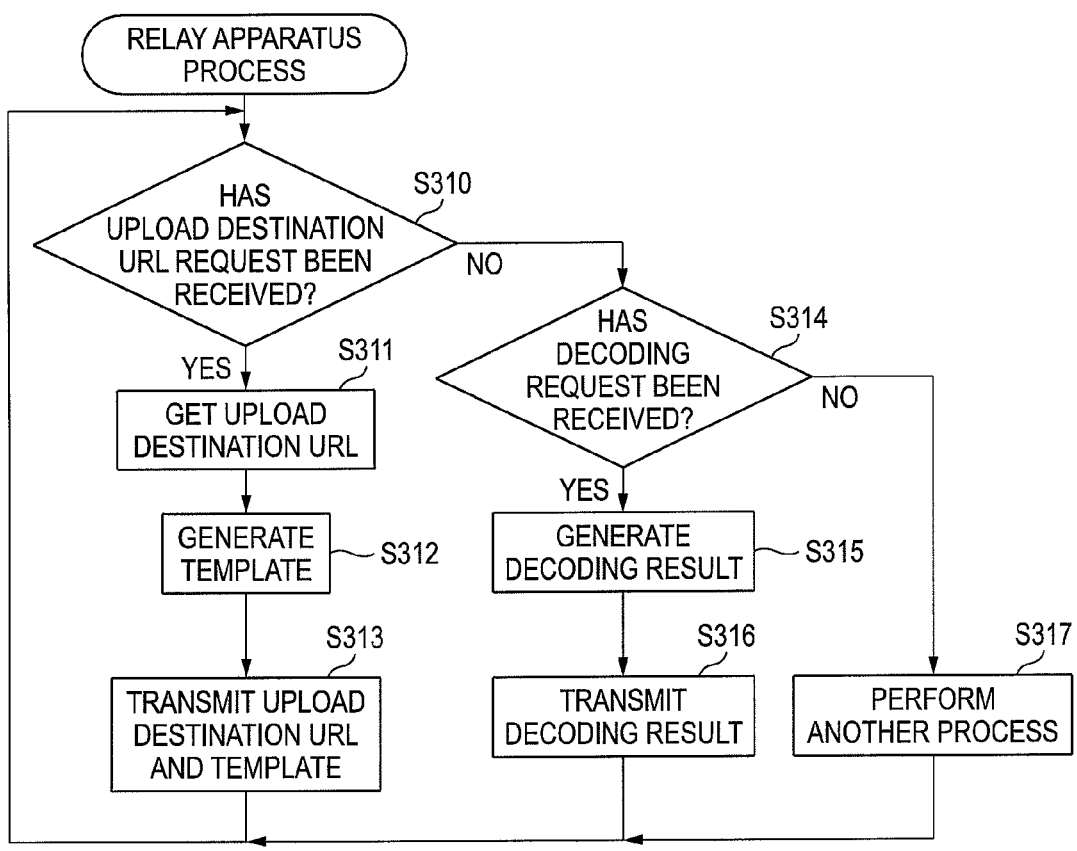
FIG. 6 is a flow chart illustrating a relay apparatus process of a relay apparatus.

Next, a detailed operation of the relay apparatus 200 will be described with reference to FIG. 6. When the relay program stored in the storage unit 230 starts to be executed, the control unit 220 of the relay apparatus 200 starts a relay apparatus process shown in FIG. 6 in accordance with the relay program.

When the relay apparatus process starts, first, in step S310, the control unit 220 determines whether the upload destination URL request has been received from the multi-function device 100.

In a case where the control unit 220 determines that the upload destination URL request has been received (Yes in step S310), in step S311, the control unit 220 gets the upload destination URL from the service providing apparatus 300.

Specifically, as described with respect to step U002, the control unit 220 executes the URL getting program corresponding to the service identification information included in the received upload destination URL request so as to transmit the upload destination URL request to the service providing apparatus 300, thereby getting the upload destination URL.

After getting the upload destination URL, in step S312, the control unit 220 generates the template for the upload message corresponding to the service selected by the operation of the user. The template is generated as described with respect to step U004.

Next, the control unit 220 transmits the upload destination URL received from the service providing apparatus 300, and the generated template to the multi-function device 100 in step S313, and returns to step S310.

In a case where the control unit 220 determines in step S310 that the upload destination URL has not been received (No in step S310), in step S314, the control unit 220 determines whether the decoding request has been received from the multi-function device 100.

In a case where the control unit 220 determines that the decoding request has been received from the multi-function device 100 (Yes in step S314), in step S315, the control unit 220 generates the decoding result on the basis of the response message included in the decoding request. The control unit 220 generates the decoding request according to the decoding program corresponding to the service selected by the user. The control unit 220 can identify the service selected by the operation of the user, on the basis of the service identification information included in the decoding request.

After generating the decoding result, the control unit 220 transmits the generated decoding result to the multi-function device 100 in step S316, and returns to step S310.

In a case where the control unit 220 determines in step S314 that the decoding result has not been received (No in step S314), the control unit 220 performs another process in step S317, and returns to step S310. When the multi-function device 100 downloads a desired image from the service providing apparatus 300, the relay apparatus 200 may perform a process for relaying the communication between the multi-function device 100 and the service providing apparatus 300 as a specific example of another process.

As described above, the service cooperation system 10 can upload the electronic file of the image read by the scanner unit 170 to the service providing apparatus 300 for the electronic-file storing service. Since the electronic file does not pass through the relay apparatus 200, it is possible to suppress the operational cost of the relay apparatus 200.

The relay apparatus 200 can be connected with a plurality of multi-function devices 100 to make a plurality of multi-function devices 100 and the service providing apparatus 300 cooperate with each other. The maker business providing the service cooperation system 10 to the users can maintain the cooperation between the plurality of multi-function devices 100 and the service providing apparatus 300 for the electronic-file storing service only by updating the URL getting program of the relay apparatus 200, if necessary.

Second Exemplary Embodiment

Next, a service cooperation system 10 according to a second exemplary embodiment of the present invention will be described with reference to FIG. 7. The second exemplary embodiment is different from the first exemplary embodiment in the relay apparatus process of the relay apparatus 200, and identical components of the second exemplary embodiment as those in the first exemplary embodiment are denoted by the same reference numerals or symbols.

Figure 7:
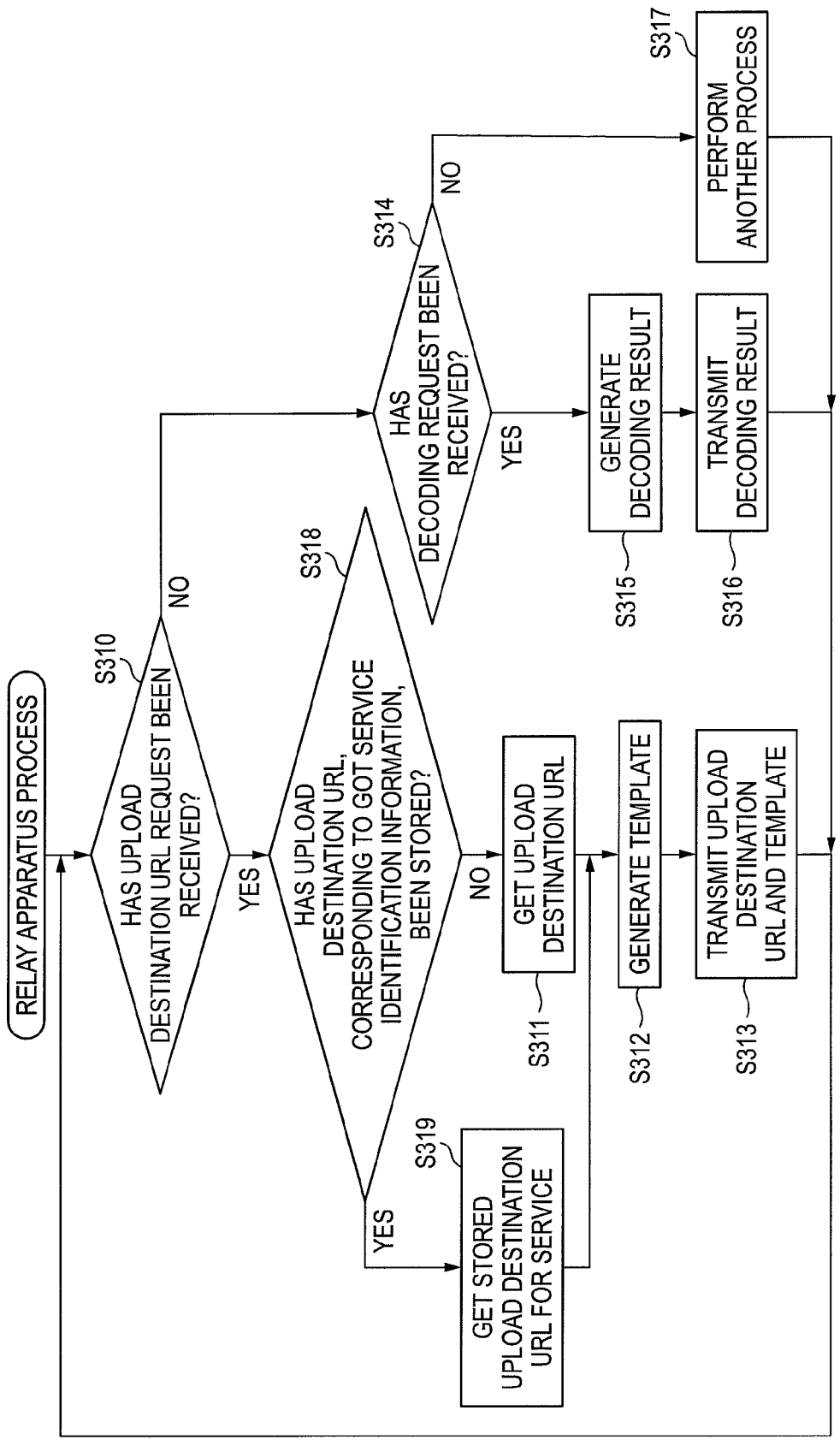
FIG. 7 is a flow chart illustrating a relay apparatus process of a relay apparatus of a service cooperation system according to a second exemplary embodiment of the present invention.

FIG. 7 is a flow chart of a relay apparatus process performed by the relay apparatus 200 of the second exemplary embodiment. A relay program controlling the relay apparatus process shown in FIG. 7 is stored in the storage unit 230.

When the relay program is executed by the control unit 220, the relay apparatus process starts. First, in step S310, the control unit 220 determines whether the upload destination URL request has been received from the multi-function device 100.

In a case where the control unit 220 determines that the upload destination URL request has been received (Yes in step S310), in step S318, the control unit 220 gets the service identification information included in the received upload destination URL request, and determines whether information on the upload destination URL corresponding to the service identified by the service identification information has been stored in the storage unit 230 or not. In a case where it is determined that the corresponding upload destination URL information has been stored in storage unit 230 (Yes in step S318), in step S319, the control unit 220 gets the upload destination URL stored in the storage unit 230. In a case where it is determined that the corresponding upload destination URL information has not been stored (No in step S318), in step S311, the control unit 220 gets the upload destination URL from the service providing apparatus 300.

After getting the upload destination URL, in step S312, the control unit 220 generates a template for an upload message corresponding to the service selected by the operation of the user. This template generation is the same as the template generation in step S312 of the first exemplary embodiment. The other steps S313 to S317 shown in FIG. 7 are the same as steps S313 to S317 shown in FIG. 6, and thus the redundant description will not be repeated.

The relay apparatus 200 of the second exemplary embodiment determines whether it is required to perform an upload destination URL request to the service providing apparatus 300 for each service identified by the service identification information, by executing the relay program controlling the relay apparatus process shown in FIG. 7. In a case where the service identified by the service identification information is a service for which the upload destination URL is stored in advance in the storage unit 230 of the relay apparatus 200, the template is generated using the stored upload destination URL. On the other hand, in a case where the service identified by the service identification information is not a service in which the upload destination URL is stored in advance in the storage unit 230 of the relay apparatus 200, the relay apparatus 200 of the second exemplary embodiment gets the upload destination URL from the service providing apparatus 300 and generates the template. According thereto, in a case where upload destination URLs are a predetermined URL like flickr (a registered trademark), the relay apparatus 200 of the second exemplary embodiment stores the URLs in advance, and in a case where the upload destination URLs are different for each service like Picasa (a registered trademark), the relay apparatus 200 of the second exemplary embodiment gets the URL from the service providing apparatus for the service. According to this configuration, upload to service providing apparatuses for various services becomes possible.

The service providing apparatus 300 is one example of a service providing apparatus of the invention. The relay apparatus 200 is one example of a relay apparatus of the invention. The scanner unit 170 is one example of an image reading unit of the invention. The multi-function device 100 is one example of an image processing apparatus of the invention. The service cooperation system 10 is one example of an image processing system of the invention. The storage unit 130 is one example of an electric-file storage unit of the invention. The control unit 120 that performs step S211 in the exemplary embodiments is one example of an address-get-request transmitting unit of the invention. The control unit 120 that performs step S218 in the exemplary embodiments is one example of an upload-message generating unit of the invention. The control unit 120 that performs step S219 in the exemplary embodiments is one example of an upload-message transmitting unit of the invention. The storage unit 230 is one example of an upload-destination-address-get-program storage unit of the invention. The control unit 220 that performs step S311 in the exemplary embodiments is one example of an upload-destination-address getting unit of the invention. The control unit 220 that performs step S313 in the exemplary embodiments is one example of an upload-destination-address transmitting unit of the invention. The control unit 120 that performs step S221 in the exemplary embodiments is one example of a decoding-request transmitting unit of the invention. The control unit 120 that performs step S223 in the exemplary embodiments is one example of a display control unit of the invention. The control unit 220 that performs step S315 in the exemplary embodiments is one example of a read-result generating unit of the invention. The control unit 220 that performs step S316 in the exemplary embodiments is one example of a read-result transmitting unit of the invention. The memory card controller 140 is one example of a data read unit of the invention. The control unit 220 that performs step S312 in the exemplary embodiments is one example of a template generating unit. The control unit 220 that performs step S318 in the exemplary embodiments is one example of a determining unit. The control unit 120 that performs step S216 is one example of an electronic-file generating unit. The control unit that performs process when Yes in step S220 is one example of an upload-result receiving unit.

It is apparent that the invention is not limited to the above-described exemplary embodiments, but may be variously modified without departing from the scope of the invention.

In the above-described exemplary embodiments, in step S312 of the relay apparatus process, the control unit 220 of the relay apparatus 200 generates the template. However, the present invention is not limited thereto. For example, templates corresponding to each service may be stored in the storage unit 230 in advance, and the relay apparatus 200 may transmit a corresponding template to the multi-function device 100.

In the above-described exemplary embodiments, in step S221 of the upload process, the multi-function device 100 transmits the decoding request to the relay apparatus 200. However, the present invention is not limited thereto. For example, steps S221 to S223 may be skipped. In this case, the multi-function device 100 may perform the decoding process. In this case, decoding programs for each service are required.

In the above-described exemplary embodiments, the account information necessary for the upload destination URL request is stored in the relay apparatus 200 in advance. However, the present invention is not limited thereto. For example, whenever it is required to generate the upload destination URL request, the relay apparatus 200 may inquire about the necessary account information from the multi-function device 100. The multi-function device 100 receiving the inquiry about the account information may display an account information inquiry screen on the display unit 150, and the user may perform account information input or selection by operation. Then, the multi-function device 100 may transmit the account information input or selected by the operation of the user, to the relay apparatus 200. Therefore, the relay apparatus 200 can identify the necessary account information. The relay apparatus 200 may generate the inquiry screen corresponding to each service, in a markup language such as XML or HTML. The relay apparatus 200 may transmit a message of the inquiry screen generated in the markup language such as XML or HTML, to the multi-function device 100. The multi-function device 100 may perform rendering on the basis of the received message, thereby capable of displaying the inquiry screen corresponding to the service designated by the operation of the user. The multi-function device 100 may further include a driver for performing rendering on inquiry screens according to each service written in markup languages such as XML or HTML, so as to be able to display the inquiry screens. In this case, the user can input or select the account information according to each service by operation. The inquiry screens corresponding to each service may be different for each kind of account information input or selected by operation of the user. This interactive process may be performed not only before the upload destination URL request is transmitted but also before any request message is transmitted form the relay apparatus 200 to the service providing apparatus 300, whereby it is possible to easily perform cooperation with various services.

What is claimed is:

1. An image processing system comprising:
   a relay apparatus that is connected to a network, to which a service providing apparatus for an electronic-file storing service is connected; and
   an image processing apparatus connected to the network,
   wherein the image processing apparatus comprises:
   an electronic-file storage unit configured to store an electronic file of an image;
   an address-get-request transmitting unit configured to transmit a request for getting an upload destination address representing a destination for upload of the electronic file to the service providing apparatus to the relay apparatus;
   an upload-message generating unit configured to, upon receiving the upload destination address and a template for an upload message for performing an upload request to the service providing apparatus from the relay apparatus after the request for getting the upload destination address is transmitted to the relay apparatus by the address-get-request transmitting unit, generate the upload message including the electronic file stored in the electronic-file storage unit and the upload destination address according to the received template; and
   an upload-message transmitting unit configured to transmit the upload message generated by the upload-message generating unit to the service providing apparatus so as to perform upload of the electronic file to the service providing apparatus, a display unit configured to display information;

a decoding-request transmitting unit configured to, upon receiving a response message from the service providing apparatus which has received the upload message, transmit a request for decoding the response message including an upload result to the relay apparatus, and a display control unit configured to, when the decoding result is received from the relay apparatus after the decoding request is transmitted to the relay apparatus by the decoding-request transmitting unit, display the upload result on the display unit according to the decoding result, and wherein the relay apparatus comprises:

a program storage unit configured to store an upload destination address get program for getting the upload destination address from the service providing apparatus, wherein the upload destination address get program uses an API provided for using the electronic-file storing service;

an upload-destination-address getting unit configured to, upon receiving the request for getting the upload destination address from the image processing apparatus, get the upload destination address from the service providing apparatus by executing the upload destination address get program;

an upload-destination-address transmitting unit configured to, upon receiving the request for getting the upload destination address from the image processing apparatus, transmit the template for the upload message and the upload destination address got by the upload-destination-address getting unit to the image processing apparatus;

a decoding-result generating unit configured to, upon receiving the decoding request from the image processing apparatus, decode the response message included in the decoding request and generate the decoding result, and a decoding-result transmitting unit configured to transmit the decoding result generated by the decoding-result generating unit to the image processing apparatus.

2. The image processing system according to claim 1, wherein the image processing apparatus further comprises an operation unit that is operable for selecting one service of a plurality of electronic-file storing services provided by the service providing apparatus, wherein the address-get-request transmitting unit transmits a request for getting an upload destination address corresponding to an electronic-file storing service selected by operation of a user, wherein the upload destination address represents the destination for upload of the electronic file to the service providing apparatus, wherein the program storage unit stores a plurality of upload destination address get programs corresponding to the plurality of electronic-file storing services, wherein the upload-destination-address getting unit gets the upload destination address from the service providing apparatus by executing an upload destination address get program corresponding to the electronic-file storing service selected by operation of the operation unit, and wherein the upload-destination-address transmitting unit that transmits the template for the upload message corresponding to the electronic-file storing service selected by operation of the operation unit and the upload destination address got by the upload-destination-address getting unit to the image processing apparatus.

3. The image processing system according to claim 2, wherein the relay apparatus further comprises a template generating unit configured to generate the template for the upload message corresponding to the electronic-file storing service selected by the operation of the operation unit from a plurality of templates for upload messages corresponding to the plurality of electronic-file storing services, and wherein the upload-destination-address transmitting unit transmits the template for the upload message generated by the template generating unit and the upload destination address got by the upload-destination-address getting unit to the image processing apparatus.

4. The image processing system according to claim 1, wherein the relay apparatus further comprises a determining unit configured to determine whether an upload destination address of a service providing apparatus identified by service identification information included in the request for getting the upload destination address received from the image processing apparatus has been stored in the relay apparatus, wherein in a case where the determining unit determines that the upload destination address has been stored, the upload-destination-address getting unit gets the stored upload destination address, and wherein in a case where the determining unit determines that the upload destination address has not been stored, the upload-destination-address getting unit gets the upload destination address from the service providing apparatus identified by the service identification information by executing the upload destination address get program.

5. An image processing method used for an image processing system, wherein the image processing system comprises: a relay apparatus connected to a network, to which a service providing apparatus for an electronic-file storing service is connected;

and an image processing apparatus connected to the network, wherein the image processing apparatus is configured to perform steps comprising:

an electronic-file storage step that stores an electronic file of an image, an address-get-request transmitting step that transmits a request for getting an upload destination address representing a destination for upload of the electronic file to the service providing apparatus;

an upload-message generating step which, upon receiving the upload destination address and a template for an upload message for performing an upload request to the service providing apparatus from the relay apparatus after the request for getting the upload destination address is transmitted to the relay apparatus by the address-get-request transmitting step, generates the upload message including the electronic file stored by the electronic-file storage step and the upload destination address according to the received template; and an upload-message transmitting step that transmits the upload message generated in the upload-message generating step, to the service providing apparatus so as to perform upload of the electronic file to the service providing apparatus, a display step that displays information;

a decoding-request transmitting step which, upon receiving a response message from the service providing apparatus which has received the upload message, transmits a request for decoding the response message including an upload result to the relay apparatus, and a display control step which, when the decoding result is received from the relay apparatus after the decoding request is transmitted to the relay apparatus by the decoding-request transmitting unit, displays the upload result on the display unit according to the decoding result, and wherein the relay apparatus performs steps comprising:

a program storage step that stores an upload destination address get program for getting the upload destination address from the service providing apparatus, wherein the upload destination address get program uses an API provided for using the electronic-file storing service;

an upload-destination-address getting step which, upon receiving the request for getting the upload destination address from the image processing apparatus, gets the upload destination address from the service providing apparatus by executing the upload destination address get program; and an upload-destination-address transmitting step which, upon receiving the request for getting the upload destination address from the image processing apparatus, transmits the template for the upload message and the upload destination address got by the upload-destination-address getting step to the image processing apparatus;

a decoding-result generating step which, upon receiving the decoding request from the image processing apparatus, decodes the response message included in the decoding request and generates the decoding result, and a decoding-result transmitting step that transmits the decoding result generated by the decoding-result generating unit to the image processing apparatus.

6. An image processing apparatus that is connected to a network, to which a relay apparatus and a service providing apparatus for an electronic-file storing service are connected, the image processing apparatus comprising:

an electronic-file storage unit configured to store an electronic file of an image;

an address-get-request transmitting unit configured to transmit a request for getting an upload destination address representing a destination for upload of the electronic file to the service providing apparatus to the relay apparatus;

an upload-message generating unit configured to, upon receiving the upload destination address and a template for an upload message for performing an upload request to the service providing apparatus from the relay apparatus after the request for getting the upload destination address is transmitted to the relay apparatus by the address-get-request transmitting unit, generate the upload message including the electronic file stored in the electronic-file storage unit and the upload destination address according to the received template;

an upload-message transmitting unit configured to transmit the upload message generated by the upload-message generating unit, to the service providing apparatus so as to perform upload of the electronic file to the service providing apparatus;

a display unit configured to display information;

a decoding-request transmitting unit configured to, upon receiving a response message from the service providing apparatus which has received the upload message, transmit a request for decoding the response message including an upload result to the relay apparatus, a display control unit configured to, when the decoding result is received from the relay apparatus after the decoding request is transmitted to the relay apparatus by the decoding-request transmitting unit, display the upload result on the display unit according to the decoding result.

7. The image processing apparatus according to claim 6, further comprising:

an image read unit configured to read an image formed on a sheet; and an electronic-file generating unit configured to generate an electronic file of the image read by the image read unit, wherein the electronic-file storage unit stores the electronic file generated by the electronic-file generating unit.

8. The image processing apparatus according to claim 6, further comprising:

a data read unit configured to read an electronic file from an installable memory medium, wherein the electronic-file storage unit stores the electronic file read by the data read unit.

9. The image processing apparatus according to claim 6, further comprising:

an upload-result receiving unit configured to receive a response message including an upload result from the service providing apparatus after the upload message is transmitted to the service providing apparatus by the upload-message transmitting unit.

10. A relay apparatus that is connected to a network, to which a service providing apparatus for an electronic-file storing service and an image processing apparatus are connected, the relay apparatus comprising:

a program storage unit configured to store an upload destination address get program for getting the upload destination address from the service providing apparatus, wherein the upload destination address get program uses an API provided for using the electronic-file storing service, an upload-destination-address getting unit configured to, upon receiving a request for getting the upload destination address from the image processing apparatus, get the upload destination address from the service providing apparatus by executing the upload destination address get program, a template generating unit configured to generate a template for an upload message for performing a request for upload to the service providing apparatus, an upload-destination-address transmitting unit configured to, upon receiving the request for getting the upload destination address from the image processing apparatus, transmit the template for the upload message generated by the template generating unit and the upload destination address got by the upload-destination-address getting unit to the image processing apparatus, a decoding-result generating unit configured to, upon receiving the decoding request from the image processing apparatus, decode the response message included in the decoding request and generates the decoding result, and a decoding-result transmitting unit configured to transmit the decoding result generated by the decoding-result generating unit to the image processing apparatus for display by the image processing apparatus.

11. The relay apparatus according to claim 10, further comprising:
a determining unit configured to determine whether an upload destination address of a service providing apparatus identified by service identification information included in the request for getting the upload destination address received from the image processing apparatus has been stored in the relay apparatus,
wherein in a case where the determining unit determines that the upload destination address has been stored, the upload-destination-address getting unit gets the stored upload destination address, and
wherein in a case where the determining unit determines that the upload destination address has not been stored, the upload-destination-address getting unit gets the upload destination address from the service providing apparatus identified by the service identification information by executing the upload destination address get program.

12. A non-transitory computer-readable medium having a relay program stored thereon and readable by a computer for controlling a relay apparatus that is connected to a network, to which a service providing apparatus for an electronic-file storing service and an image processing apparatus are connected, said relay program, when executed by the computer, causes the computer to perform operations comprising:
a program storage step that stores an upload destination address get program for getting the upload destination address from the service providing apparatus, wherein the upload destination address get program uses an API provided for using the electronic-file storing service;
an upload-destination-address getting step which, upon receiving a request for getting the upload destination address from the image processing apparatus, gets the upload destination address from the service providing apparatus by executing the upload destination address get program;
a template generating step that generates a template for an upload message for performing a request for upload to the service providing apparatus; and
an upload-destination-address transmitting step which, upon receiving the request for getting the upload destination address from the image processing apparatus, transmits the template for the upload message generated by the template generating step and the upload destination address got by the upload-destination-address getting step to the image processing apparatus;
a decoding-result generating step which, upon receiving the decoding request from the image processing apparatus, decodes the response message included in the decoding request and generates the decoding result, and
a decoding-result transmitting step that transmits the decoding result generated by the decoding-result generating unit to the image processing apparatus for display by the image processing apparatus.

* * * * *